United States Patent [19]

Bartlett

[11] 3,813,529

[45] May 28, 1974

[54] DIGITAL HIGH ORDER INTERPOLATOR

[75] Inventor: Kenneth G. Bartlett, San Jose, Calif.

[73] Assignee: The Singer Company, Binghamton, N.Y.

[22] Filed: Oct. 25, 1972

[21] Appl. No.: 300,595

[52] U.S. Cl. .............................................. 235/152
[51] Int. Cl. ......................................... G06f 15/34
[58] Field of Search ............... 235/152, 197, 150.53

[56] References Cited
UNITED STATES PATENTS

| | | | |
|---|---|---|---|
| 3,247,365 | 4/1966 | Dell et al. | 235/152 X |
| 3,412,240 | 11/1968 | Hunt et al. | 235/152 X |
| 3,678,258 | 7/1972 | Patmore et al. | 235/197 X |

OTHER PUBLICATIONS

E. C. Johnson, "Interpolation–A Link Between Programmed Points & Smooth Curves," Control Engineering, Sept. 1958 pp. 153–157.

Primary Examiner—Malcolm A. Morrison
Assistant Examiner—David H. Malzahn
Attorney, Agent, or Firm—William Grobman; James C. Kesterson

[57] ABSTRACT

A system is disclosed herein which is designed to generate the value for dependent variables of given mathematical functions when provided with corresponding independent variables as inputs thereto by computing a Taylor Series Expansion of that function. Any function for which a Taylor Series Expansion exists in the region of interest may be generated by the disclosed system. A read-only memory is disposed for storing a plurality of predetermined parameters of a Taylor Series Expansion for each function to be computed. An asynchronous binary product generator and a binary adder are provided, external to the read-only memory, for performing cyclic computations of the Taylor Series Expansion. A control circuit is provided for synchronizing the operation of the individual constituent circuits.

6 Claims, 9 Drawing Figures

Fig_1

Fig_2

Fig_3

Fig_4

Fig_5

Fig. 6

Fig_7

DIGITAL HIGH ORDER INTERPOLATOR

BACKGROUND OF THE INVENTION

1. Field of the Invention

This invention relates to electronic computing devices, and more particularly, to circuitry for generating the values for dependent variables of a given function in response to input signals representative of independent variables of the given function. The functions which may be computed by the device of the present invention include trigonometric functions, exponential functions, transcendental functions, and so forth.

2. Description of the Prior Art

In the general computing arts, devices which operate at high speeds are desirable for efficiently computing mathematical functions. The use of high speed devices is primarily a question of economics. However, in computing devices which are employed for real-time computations, for example systems which simulate some physical phenomenon, it is desirable that rapid solutions to mathematical functions be generated.

It has been the practice in the past to compute mathematical functions by programming computers with any number of well-known techniques. These techniques are slow when compared to special-purpose computing devices such as that of the present invention. In general, these techniques involve the process of performing a plurality of fundamental mathematical computations, repetitively, to generate solutions to such functions. Also, the computer program techniques require portions of the computer memory which could better be used for other operations.

There have been numerous special purpose computing devices designed in the past to compute mathematical functions. One such device is disclosed in "The logic of Computer Arithmetic" by Ivan Flores in chapters 17.5 and 17.6. This prior art device computed functions by implementation of the formula, $$S_k = \Sigma A_i X^{a+b},$$

which used the basic elements of a computer arithmetic unit, are employed extra registers to temporarily store intermediate results during the function computation process. This prior art device was essentially a straightforward implementation of the computer programming techniques discussed hereinabove. An increase in speed was accomplished by this device at the expense of additional circuit components. However, this device was relatively slow in speed of operation with respect to system cycle time.

A second type of special-purpose computing device is disclosed in "Digital Computer and Control Engineering" by Robert S. Ledley, chapter 8. This prior art device is a digital version of the well-known differential analyzer, and computes mathematical functions by generating successive dependent variable values of the function. The successive values generated are added to a known dependent variable value at a known independent variable point. This device generated a relatively accurate answer, and required fewer circuits than the other prior art devices, but at the expense of a slower speed of operation.

A third type of prior art special-purpose computing device is disclosed in co-pending application "High-Speed Function Generator" of Curtis J. Blanding, Ser. No. 258,953, filed June 2, 1972. This device operates at a very high speed; however, it is limited to the evaluation of trigonometric functions. A still further prior art device is disclosed in U.S. Pat. No. 3,412,240 of J. M. Hunt, et al, for "Linear Interpolator." This device evaluates polynomials by straightline approximations of the functions. A disadvantage of the linear interpolator as compared to the device of the present invention is that stralight-line approximations of the function may generate erroneous results. If a larger number of reference independent variable values were employed to improve the accuracy of the final answer, then a larger memory would be required to store these values.

As will be shown in the detailed description hereinbelow, the special purpose computing device of the present invention overcomes and mitigates the disadvantages of the prior art devices discussed hereinabove. Also, it will be shown that the device of the present invention operates at a speed which will compute functions at a speed which is adequate for realtime simulation of some physical phenomenon.

SUMMARY OF THE INVENTION

The present invention contemplates a system for computing mathematical functions, which comprises a memory for storing predetermined parameters of a Taylor Series Expansion, a high-speed product generator for generating successive products of intermediate results by an independent variable differential, and an adder for adding the successive products to the parameters recovered from the memory. A control circuit and gating circuits are provided for synchronization of operation, and control of the routing of intermediate results of an individual computation.

Accordingly, it is an object of the present invention to provide a special-purpose computing device which has capabilities of generating dependent variable values of mathematical functions.

It is still another object of the present invention to provide a mathematical function computer which has a very high speed of operation.

It is a further object of the present invention to provide a mathematical function computer which employs a read-only memory for storing parameters of a Taylor Series Expansion of preselected mathematical functions.

It is a still further object of the present invention to provide a mathematical function computer which accepts as inputs thereto binary numbers representative of the function to be performed and an independent variable differential of said function, and supplies a binary number at an output thereof representative of the corresponding dependent variable value.

Another object of this invention is to provide an improved device for solving the Taylor Series Expansion of a mathematical function:

$$y = f(x_1) + f'(x_1) \cdot (\Delta x) + [f''(x_1) \cdot (\Delta x)^2]/[2!] + [f'''(x_1) \cdot (\Delta x)^3]/[3!] + [f''''(x_1) \cdot (\Delta x)^4]/[4!] \ldots$$

And more particularly, it is an object of this invention to provide a means for computing a mathematical function by adding a number recovered from memory to the product of a multiplication, multiplying this sum by an independent variable differential to derive a new product, and adding this new product to another number recovered from memory, repetitively, for a finite number of iterations.

It is another object of the present invention to provide a mathematical function computer which overcomes the disadvantages of the prior art as characterized in the preceding objects and which is simple in construction, reliable in operation, and relatively low in cost.

These and other objects and advantages of the present invention will become clear to one normally skilled in the art from a perusal of the appended specification when taken in conjunction with the drawings.

DETAILED DESCRIPTION OF THE PREFERRED EMBODIMENT

The preferred embodiment of the present invention computes mathematical functions by use of the Taylor Series Expansion of the function. This series is illustrated in mathematical text books, for example "Calculus and Analytic Geometry" by G. B. Thomas, Jr., third edition, page 787, and is represented by the following equation:

$$y = f(x_1) + f'(x_1) \cdot (\Delta x) + f''(x_1) \cdot (\Delta x)^2/[2!] + [f'''(x_1) \cdot (\Delta x)^3]/[3!] + ]f''''(x_1) \cdot (\Delta x)^4]/[4!] \ldots \quad [1]$$

The range of independent variable values of the mathematical function to be computed is divided uniformly, and each division point will hereafter be referred to as a "break point." It should be pointed out that the break point values are designated mathematically herein as $x_1, x_2, x_3, x_4$, etc. The independent variable at which a dependent variable value is to be generated is defined herein as $x$, and $x$ lies between two break points, or $x$ may be equal to a break point in certain cases. By definition, the possible values for $x$ will be equal to or greater than a reference break point value, but less than the value for the next succeeding break point. More particularly, this definition may be expressed mathematically as:

$$x_n \leq x < x_{n+1}$$

where $x_n$ and $x_{n+1}$ are break point values, and $x$ lies between $x_n$ and $x_{n+1}$. The value for $\Delta x$ is the independent variable differential, which is derived by subtracting the value for the reference break point from the value of $x$. This relationship may be expressed mathematically as:

$$\Delta x = x - x_n$$

wherein $x_n$ is the reference break point.

Since the general form of the equation used to compute mathematical functions is a series, the accuracy of the final answer is proportional to the number of terms used in the series. However, it is possible to relate the accuracy required of a specific embodiment to the width of the interval between break points, and to the number of terms used in the equation. In general, if a large number of terms of the series are used in the function computation, then the interval between break points may be relatively larger for a given accuracy requirement. More particularly, this relationship can be shown mathematically as:

$$\Delta x_{max} \leq [R \cdot n!]/K \; 1/n$$

where $\Delta x_{max}$ is the maximum possible interval between break points, R is the required accuracy, n is the number of terms used, as K is the maximum value of $|f^{(n)}|(x)$ 9 for all $x$ within the region of interest. By selecting a relatively small interval between break points (e.g, 1.000) for a preferred embodiment for computing the function of $y = \ln x$, it is possible to employ five terms of the Taylor Series to compute an answer which is accurate to eight binary digits. However, the degree of accuracy is dependent upon the particular function to be computed. This will be shown by an example which is described in greater detail hereinbelow.

The values of the Taylor Series Expansion must be determined prior to operation of the device of the present invention in order that they may be stored in the memory. The first step is to derive the required number of derivatives of the function to be evaluated, wherein the required numbers of derivatives is one less than the number of terms employed in equation [1] above. The next step is to solve each derivative at each break point value. It should be pointed out that a set of five parameters is derived for each break point value. The third step is to divide each of the derivative values by the corresponding denominator factorial values. The steps given hereinabove, for break point $x_1$, may be summarized mathematically as follows:

$$b_0 = f(x_1)$$
$$b_1 = f'(x_1)$$
$$b_2 = f''(x_1)/2!$$
$$b_3 = f'''(x_1)/3!$$
$$b_4 = f''''(x_1)/4!$$

If the parameters $b_0$, $b_1$, $b_2$, $b_3$, and $b_4$ are substituted into equation [1], then it follows that:

$$y = b_0 + b_1(\Delta x) + b_2(\Delta x)^2 + b_3(\Delta x)^3 + b_4(\Delta x)^4 \quad [2]$$

Equation [2] maybe rearranged into a form which is more readily implemented by grouping the addition and multiplication functions as follows:

$$y = ((((0 \cdot \Delta x + b_4) \Delta x + b_3) \Delta x + b_2) \Delta x + b_1) \Delta x + b_0 \quad [3]$$

An illustration of the computation of a typical mathematical function will be described in greater detail hereinbelow, and the parameter derivations will also be illustrated in greater detail at that juncture of the description.

Figure 1:
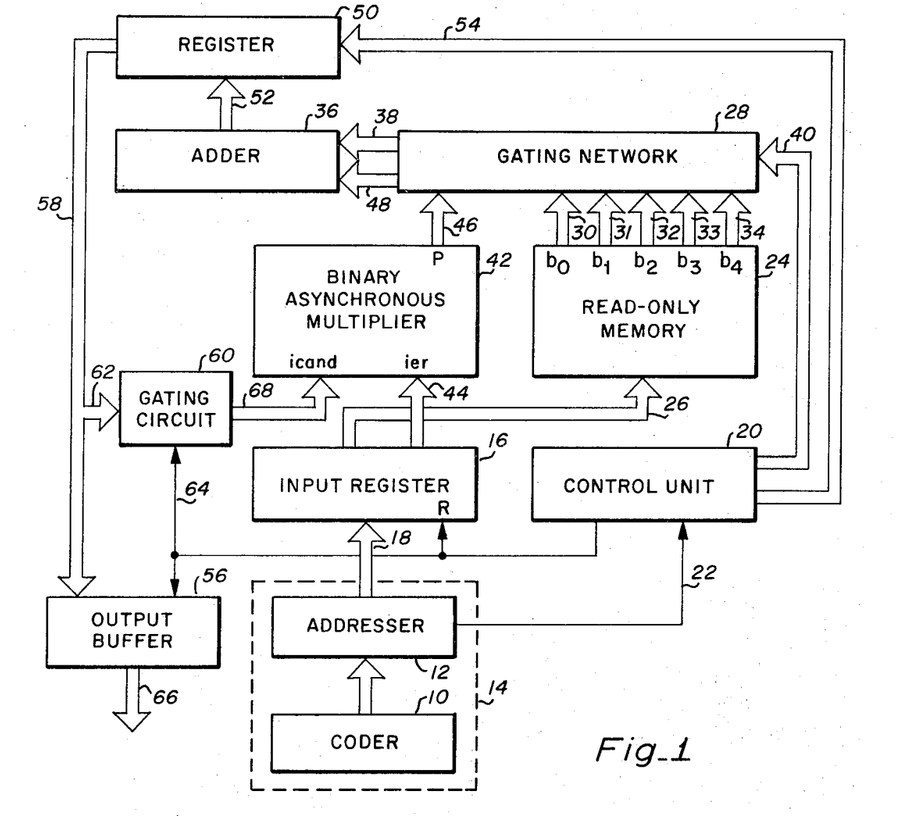
FIG. 1 is a block diagram of the system of the present invention.

With reference to FIG. 1, an input binary number is generated by a coder 10 and transmitted to an addresser 12. The coder 10 and addresser 12 may both be a part of a single device such as a digital computer 14.

The input binary number may constitute, in general, three separate parts: one part being a code for selecting the particular mathematical function to be computed; the second part being the value for the reference break point $x_n$ of the independent variable $x$; and the third part being the value for $\Delta x$ which was defined hereinabove. The first two parts of this binary number constitute the memory address. However, the first part may not be necessary if the device of the present invention is employed for computations of a single mathematical function. It should be noted that the subtraction operation that generates the value for $\Delta x$ is performed within digital computer 14, or any other such device supplying the input binary number to the system of the present invention.

The input binary number is supplied to an input register 16 by means of lines 18. Input register 16 acts as a temporary storage device for the input binary number, and comprises a plurality of well-known resettable-type flip-flops. At the same time that the input binary number is supplied to register 16, a start pulse is supplied to a control unit 20 by means of a line 22 to initiate the operation of the system of the present invention. The portion of the input binary number that constitutes the memory address is supplied to a read-only memory 24 by means of lines 26.

Read-only memory 24 may be any of several such devices presently available on the market, and the memory may comprise a multiplicity of cells which store binary information. The cells are divided into groups, wherein each group comprises a specific number of cells. Each of these individual groups of cells stores a particular combination of binary digits (a binary number) that represents a particular value. However, as will be shown in the description hereinbelow, the number of cells in a given group may vary depending upon the particular parameter stored therein. Once the value is stored within the cells, it will remain permanently stored therein. A provision is made within read-only memory 24 for addressing each of these groups of cells in response to various combinations of the binary number supplied on lines 26.

For each unique address supplied to read-only memory 24 five binary numbers, representative of parameters $b_0$, $b_1$, $b_2$, $b_3$, and $b_4$ are supplied to gating network 28 via lines 30 through 34, respectively. The individual parameters, $b_0$, $b_1$, $b_2$, $b_3$, and $b_4$, are supplied to the input of gating network 28 and are transferred, sequentially, to a binary adder 36 via lines 38 in response to signals provided on lines 40 from control unit 20.

The portion of the binary number stored in register 16 and representative of $\Delta x$ is supplied to a product generator 42 by means of lines 44. Product generator 42 is designed to operate at a very high speed and may be constructed in a manner similar to that disclosed in U.S. Pat. No. 3,691,359, entitled "Asynchronous Binary Multiplier Employing Carry-Save Addition" of Harold R. Dell and Edwardo D. Lara. It is a feature of product generator 42 that a product is provided at the output thereof when multiplier and multiplicand inputs are provided thereto without the use of timing pulses. The output of product generator 42, hereafter "product binary number", is supplied as an input to gating network 28 by means of lines 46. The product binary number is transferred through network 28 to adder 36 by means of lines 48 in response to signals provided on lines 40.

It is the function of adder 36 to add binary numbers representative of the parameters provided on lines 38 to the product binary number provided on lines 48, and supply the sum of these binary numbers to the input of register 50 via lines 52. Adder 36 may be constructed in a manner as shown in "Pulse, Digital, and Switching Waveforms" by Millman and Taub on page 340. This is a conventional well-known binary adder circuit and comprises a plurality of individual full-adder circuits. However, if the system of the present invention is employed for real-time computations which require answers at high speeds, then a fast adder is employed. The principles of designing fast adders are disclosed in greater detail in "Design of Digital Computers" by H. W. Gschwind on pages 195 through 199.

Register 50 comprises a plurality of flip-flops which temporarily store the value of the sum from adder 36, and this sum is entered into the register when a clock pulse is supplied to CLOCK inputs thereto. The contents of the register may be reset by the application of a reset pulse to RESET inputs thereto. Clock and reset pulses are supplied to register 50 by means of lines 54 from control circuit 20. The output of register 50, which comprises a 16 digit binary number, is supplied to output buffer 56 by means of lines 58. The eight most significant digits of the binary number provided on lines 58 are supplied to a gating circuit 60 by means of lines 62. Buffer 56 and gating circuit 60 both comprise a plurality of logic-AND gates which effect the transfer of binary digits therethrough upon the application of a signal on line 64. However, as will be shown in greater detail hereinbelow, output buffer 56 and gating circuit 60 are enabled mutually exclusively of one another in response to the signal on line 64. More particularly, gating circuit 60 is enabled when buffer 56 is disabled, and buffer 56 is enabled when gating circuit 60 is disabled. The output of buffer 56 is provided on lines 66 and constitutes the final answer supplied by the system of the present invention. The output of gating circuit 60 is supplied to the multiplicand (icand) input of product generator 42 by means of lines 68. It should be pointed out that the final answer supplied on lines 66 may be provided to equipment external to that shown in FIG. 1, or it may be provided as an input to computer 14. Line 64 is also connected to the RESET input of register 16, and this register is reset at the same time that buffer 56 is enabled. The device of the present invention may be more fully understood from the description hereinbelow of an exemplary mathematical function computation and a detailed description of the individual circuits.

Figure 2:
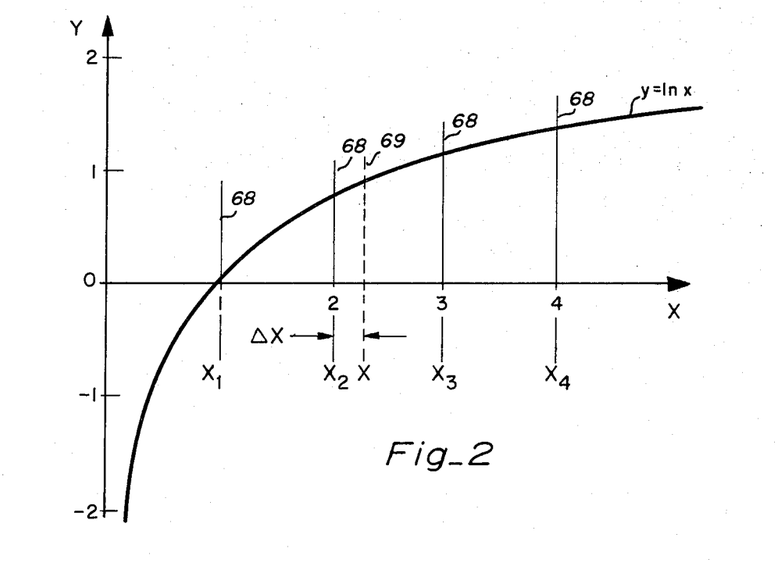
FIG. 2 is a graphical plot of a typical mathematical function which may be evaluated by the system of the present invention.

Referring now to FIG. 2, a graphical plot of a function $y = \ln x$ is illustrated in the conventional cartesian coordinate system $(x, y)$. Vertical lines 68 represent break points, $x_1, x_2, x_3, x_4$, etc. A dashed vertical line 69 represents an independent variable point $x$ at which a corresponding dependent variable $y$ is to be evaluated (i.e. the magnitude of y is to be evaluated at point $x$). The derivatives of the function $y = \ln x$ at the reference point $x_2$ are as follows:

$f(x_2) = \ln x_2$
$f'(x_2) = (x_2)^{-1}$
$f''(x_2) = (-x_2)^{-2}$
$f'''(x_2) = (2x_2)^{-3}$
$f''''(x_2) = (-6x_2)^{-4}$

Assume that the value of $x_2$ is equal to 2. Then the value of the individual parameters (computed from the values for $b_0$ through $b_4$ listed hereinabove), which are stored in read-only memory 24, are as follows:

$b_0 = \ln 2 = 0.6930$
$b_1 = \frac{1}{2} = 0.5000$
$b_2 = (-\frac{1}{4})(1/2) = -0.1250$
$b_3 = (\frac{1}{4})(1/6) = 0.0417$
$b_4 = (-\frac{3}{8})(1/24) = -0.0156$ Assume further that the value of $x$ is equal to 2.25; and, therefore, the value for $\Delta x$ is equal to 0.25.

The input binary number which is generated within digital computer system 14, may be represented as follows:

0001 0010.01000000

This input binary number is temporarily stored in register 16 and represents the selection of a natural logarithm evaluation (0001 by definition), a break point value of 2 (0010 in binary form), and a $\Delta x$ value of 0.25 (0.01000000 in binary form). In the alternative, the function selection binary number 0001 may be provided as a separate address input to the memory from digital computer 14, and may not necessarily be an integral part of the input binary number. If the system of the present invention is employed for computing a single mathematical function, then the function selection is not needed. A start pulse is supplied to control unit 20 to initiate the operation of the individual circuits. The binary number 0001 0010 is supplied as an address input to read-only memory 24 by means of lines 26, and the value of $\Delta x$ (0.01000000) is supplied to product generator 42 by means of lines 44.

The binary number appearing at the output of read-only memory 24 in response to an address input of 0001 0010 may be represented by the following table.

TABLE I

| Parameter | $b_0$ | $b_1$ | $b_2$ | $b_3$ | $b_4$ |
|---|---|---|---|---|---|
| Decimal | 0.69315 | 0.50000 | −0.1250 | 0.0417 | −0.0156 |
| Binary | .11010001 | .10000000 | .11100000 | .00001011 | .11111100 |

It is pointed out that the decimal values are rounded off before conversion to binary form. However, if a larger memory and adder were employed, greater precision could be obtained by the use of a larger number of binary digits.

Figure 3:
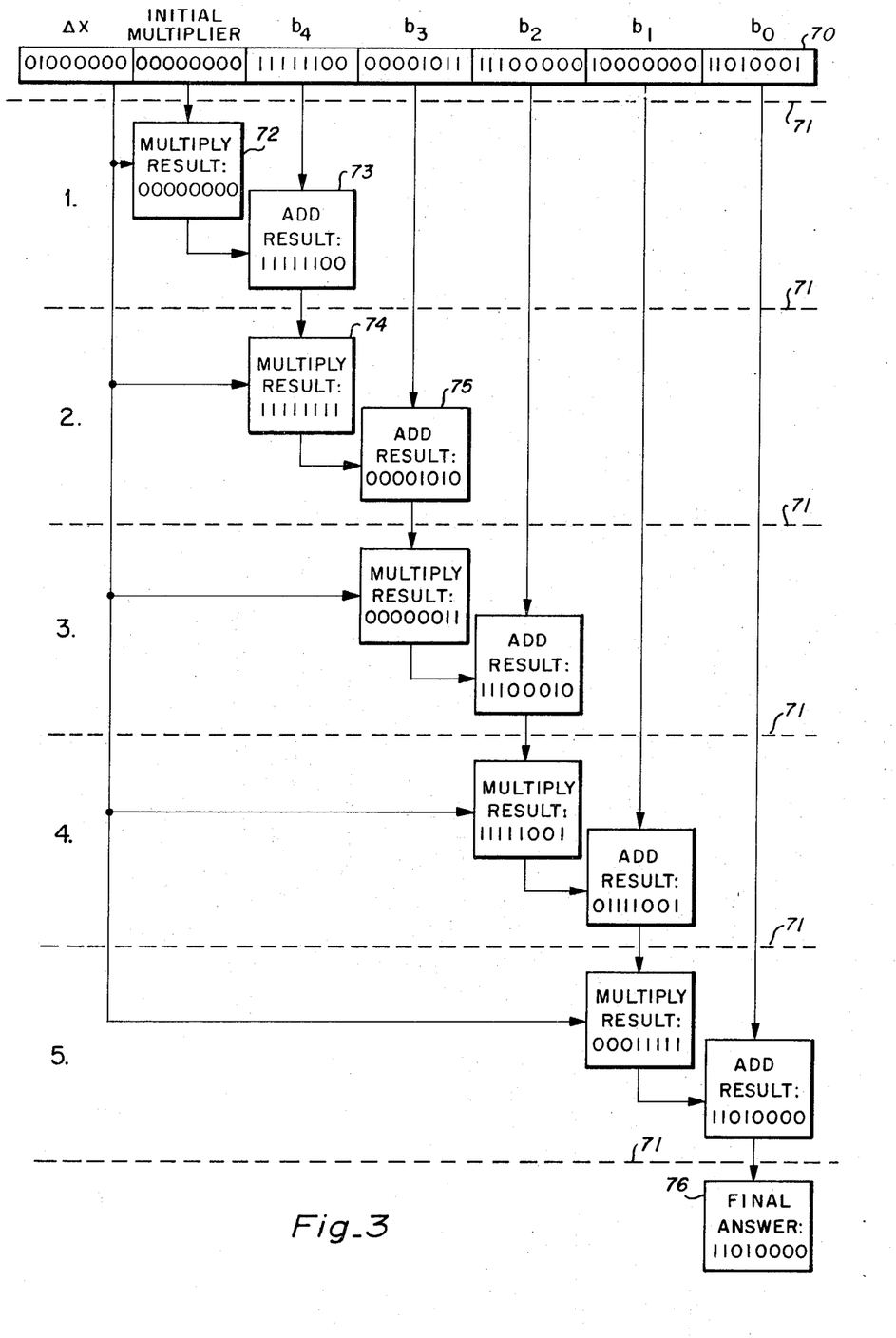
FIG. 3 is a flow chart illustrating the subcycle operations performed in computing typical mathematical functions.

The evaluation of the particular example under discussion ($y = \ln 2.25$), is illustrated in greater detail in the flow chart shown in FIG. 3. Before continuing the discussion of the operation of the present invention, it should be pointed out that an evaluation of a single function at a single $\Delta x$ value is defined herein as a cycle of operation. This cycle of operation comprises five individual subcycles thereof, as a result of the five steps as defined in equation [3] hereinabove.

The respective values of $\Delta x$, initial multiplicand, $b_4$, $b_3$, $b_2$, $b_1$, and $b_0$ are illustrated in block 70. The number of the individual subcycles is shown in the left hand column. Each subcycle is shown to comprise the operations between dashed lines 71; and each subcycle comprises one step of multiplication and one step of addition. As defined in equation [3] hereinabove, the value for $x$ is multiplied by an initial parameter value of zero, and the product is illustrated in block 72 (0.00000000). This product is added to parameter $b_4$ and the sum is illustrated in block 72 (0.11111100), thereby completing subcycle one. The sum shown in block 72, and the value for $\Delta x$, are multiplied together and the product of this operation is illustrated in block 74 (0.11111111). Parameter $b_3$ is added to 0.11111111, and the sum of this operation is illustrated in block 75 (0.00001010), thereby completing subcycle two. Subcycles three, four, and five are performed in the same manner and the results are illustrated in the remaining blocks. At the end of subcycle five, the sum of the addition operation is provided as a a final output (answer) which is illustrated in block 76 (0.1101000). The binary number 0.11010000 is equal to 0.81250. The value for $\ln 2.25$, as found in a natural logarithm table, is equal to 0.81093. The difference between these two values is equal to 0.00157, and constitutes the error of computation of the function $y = \ln x$, wherein eight-digit binary numbers were employed in the computation. If a comparison is made of these two values in binary form (i.e. a computed answer of 11010000 and a logarithmic table value of 11001110) it can be seen that the computed answer is within eight binary digits of accuracy. The example illustrated hereinabove, was simplified for the purpose of explaining the concepts of the present invention and by no means is intended to limit the scope thereof. The amount of error could be decreased by increasing the number of binary digits employed within the circuitry, and selecting a small maximum limit for $\Delta x$. It is possible for one having ordinary skill in the art to select a practical combination of binary digits employed versus the maximum limit for the $\Delta x$ value from the expression:

$$\Delta x_{max} \leq [R \cdot n!]/K \ 1/n$$

given hereinabove.

Figure 4:
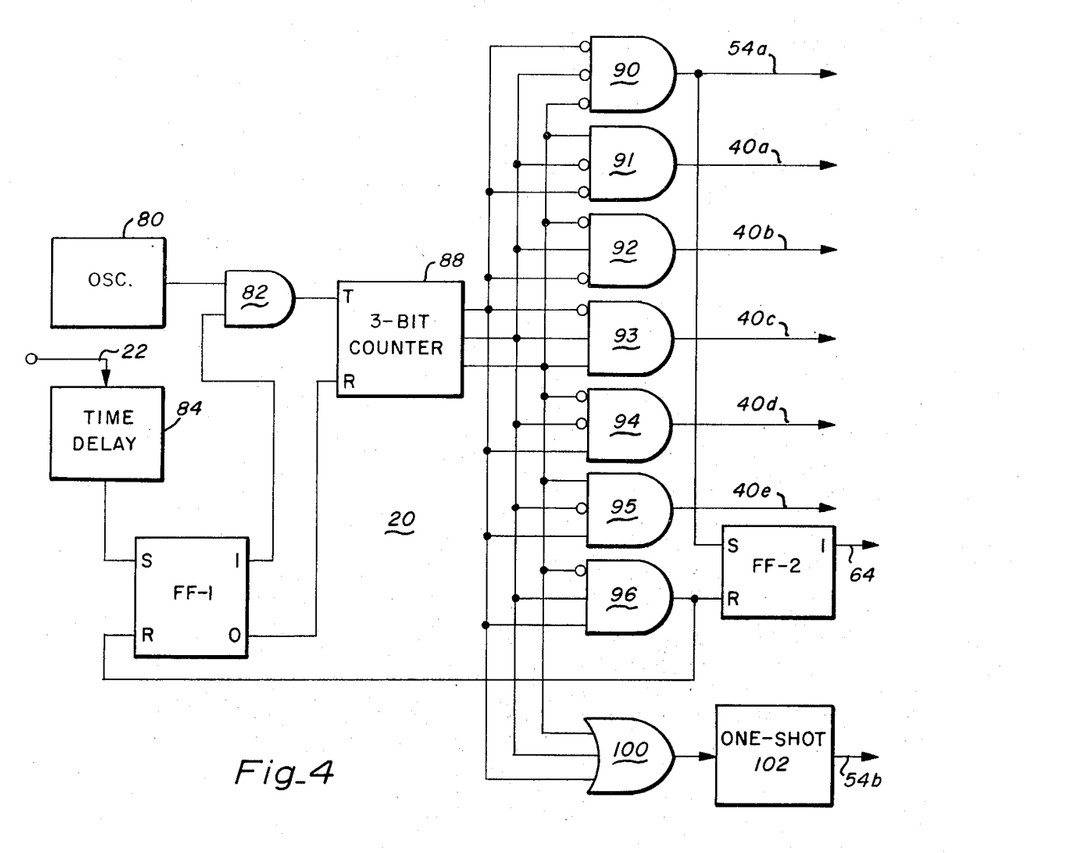
FIG. 4 is a logic diagram of the control circuit.

Referring now to FIG. 4, control unit 20 is illustrated in greater detail. The output of an oscillator 80 is supplied to one of two inputs of AND gate 82. Oscillator 80 provides a series of pulses at a constant rate, and may be constructed by any of the well-known techniques for constructing oscillators. The rate at which oscillator 80 generates pulses is determined by the time required for the circuitry of the present invention to complete a subcycle of operation.

The start pulse from addresser 12 is supplied to a time-delay circuit 84 by means of line 22. Time-delay circuit 84 is disposed for delaying the beginning of a computation cycle for an amount of time sufficient to insure entry of the input binary number into register 16. The output of time-delay circuit 84 is connected to the SET input of flip-flop FF-1. The ONE output of flip-flop FF-1 is connected to the second input of AND gate 82. When flip-flop FF-1 is set, AND gate 82 is enabled and the pulses from oscillator 80 are transferred therethrough to a TOGGLE input of a three-bit counter 88.

The outputs from counter 88 are connected to the inputs of AND gates 90 through 96 in a conventional manner for decoding the output of a binary counter. The output of AND gate 90 is supplied to line 54a which indicates a count of zero in counter 88 and is employed as the reset pulse to register 50. The output of AND gate 90 is also connected to the SET input of flip-flop FF-2. The output of AND gate 91 is supplied on line 40a and indicates a count of 1 in counter 88; the output of AND gate 92 is supplied on line 40b and indicates a count of 2 in counter 88; the output of AND gate 92 is supplied on line 40c and indicates a count of 3 in counter 88; the output of AND gate 94 is supplied on line 40d and indicates a count of 4 in counter 88; and the output of AND gate 95 is supplied on line 40e and indicates a count of 5 in counter 88. The output of AND gate 96 is connected to the RESET input of flip-flop FF-2 and indicates a count of 6 in counter 88. The output of AND gate 96 is also connected to the RESET input of flip-flop FF-1. The ONE output of flip-flop FF-2 is provided on line 64. The ONE output of flip-flop FF-1 is connected to the RESET input of counter 88. The three outputs of counter 88 are also connected, respectively, to three inputs of OR gate 100. The output of OR gate 100 is connected to the input of a one-shot 102. The output of one-shot 102 is connected to line 54b, and is employed as the clocking input signal for register 50.

Figure 5:
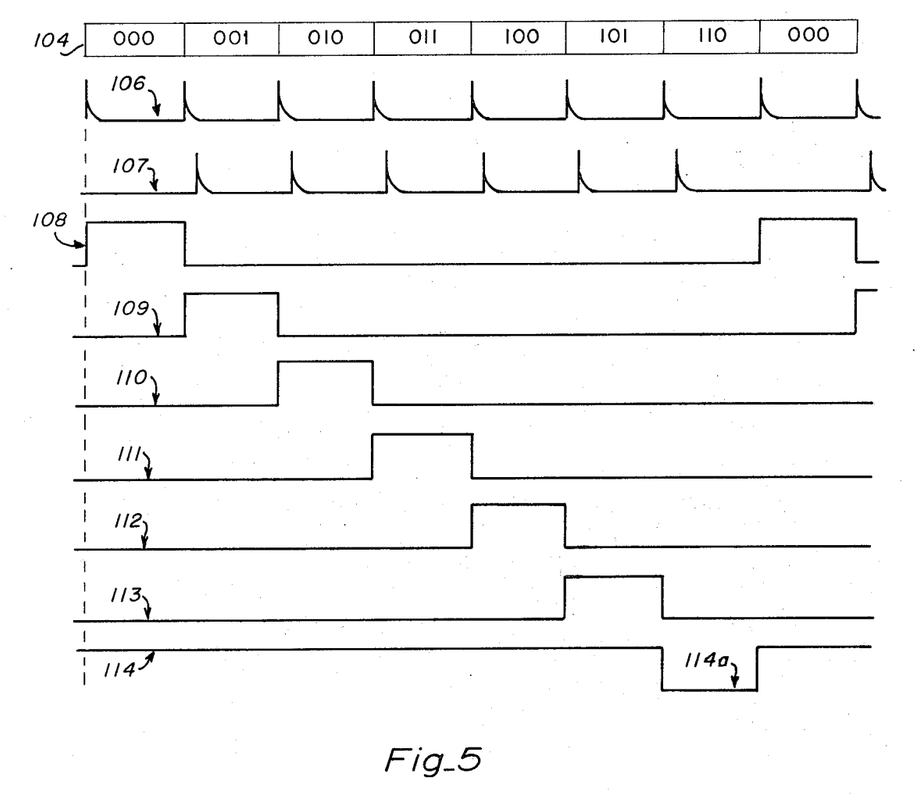
FIG. 5 is a timing diagram illustrating the timing relationship of the circuits of the present invention.

The operation of control unit 20 may be more fully understood from the timing diagram illustrated in FIG. 5. The state of the output of counter 88 is shown in block 104, and each state of the counter is aligned above the columns representative of the respective subcycles. Waveform 106 represents the output of oscillator 80; waveform 107 represents the output of one-shot 102; waveform 108 represents the output of AND gate 90; waveform 109 represents the output of AND gate 91; waveform 110 represents the output of AND gate 92; waveform 111 represents the output of AND gate 93; waveform 112 represents the output of AND gate 94; waveform 113 represents the output of AND gate 95; and waveform 114 represents the output of flip-flop FF-2.

Waveform 106 illustrates the pulses employed for generating waveforms 107 through 114. Waveforms 107, and 109 through 113, illustrate the signals employed for synchronizing the five subcycles of operation. Waveform 107 illustrates pulses which are delayed in time from corresponding pulses on waveform 106. This time-delay is used to allow sufficient time for adder 36 to complete an adding operation before the sum is entered into register 50. The purposes for the time-delay of the pulses on waveform 107 will become clearer following the discussion of the individual circuits hereinbelow. Waveforms 108 and 114 illustrate the signals employed for synchronizing a complete cycle of operation. More particularly, the signal illustrated by waveform 108 is employed for resetting register 50 to a zero state, and the low-level state 114a of the signal illustrated by waveform 114 is employed for enabling output buffer 56 whereby the final answer is provided on lines 66.

Figure 6:
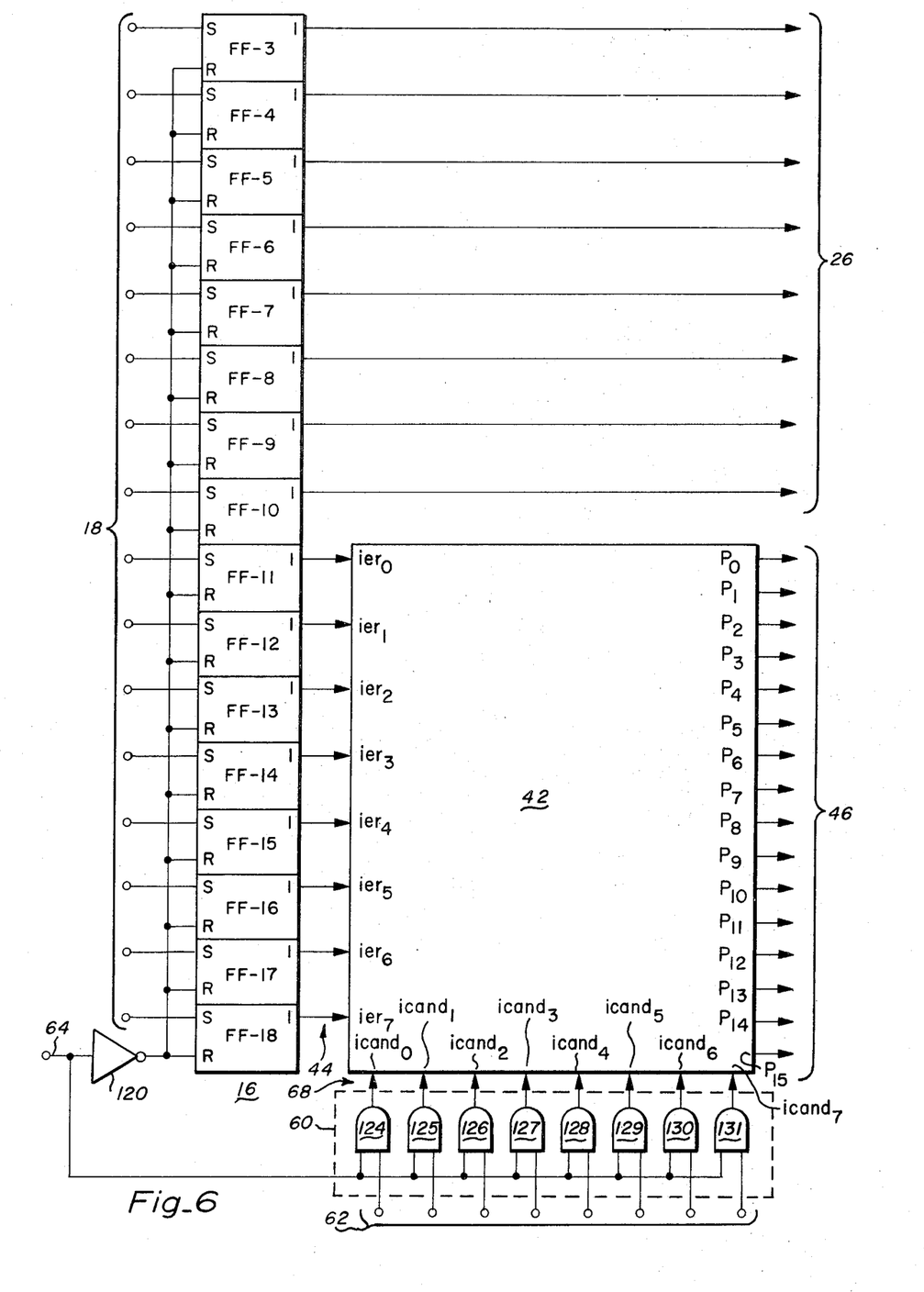
FIG. 6 is a logic-block diagram of the asynchronous binary product generator, input register, and multiplicand gating circuit.

Referring now to FIG. 6, input register 16, and gating circuit 60 are shown in greater detail with connections to a product generator 42. Each of lines 18 is connected to a SET input of one of 16 flip-flops FF-3 through FF-18 which constitute input register 16. Line 64, which originates in control unit 20, is connected to the input of an inverter 120. The output of inverter 120 is connected to the reset inputs of flip-flops FF-3 through FF-18. The ONE output of individual flip-flops FF-3 through FF-10 is connected to lines 26. The ONE output of individual flip-flops FF-11 through FF-18 is connected to individual multiplier inputs of product generator 42 (designated herein as $ier_0$ through $ier_7$) by means of lines 44.

Line 64 is also connected to the first input of AND gates 124 through 131. Lines 62 are connected individually to the second inputs of AND gates 124 through 131, respectively. The output of these AND gates are connected to the multiplicand inputs of product generator 42 (designated herein as $icand_0$ through $icand_7$) by means of lines 68. As stated hereinabove, the detailed circuitry of product generator 42 is disclosed in U.S. Pat. No. 3,691,359, entitled "Asynchronous Binary Multiplier Employing Carry-Save Addition". The output of product generator 42 is provided on lines 46 (and designated herein and $P_0$ through $P_{15}$).

The input binary number, for the example under discussion, 0001 0010.01000000, is supplied to the SET inputs of flip-flops FF-3 through FF-18. The portion of the input binary number stored within flip-flops FF-3 through FF-10 is supplied on lines 26, and the remaining portion of this binary number, which is stored within flip-flops FF-11 through FF-18, is supplied on lines 44 to product generator 42. The eight most significant digits of the output of register 50, which are provided on lines 62, are transferred through AND gates 124 through 131 when a high-level signal is present on line 64. Within a very short time interval (dependent upon the number of digits being multiplied) the product of the multiplication operation is provided on lines 46.

Figure 7:
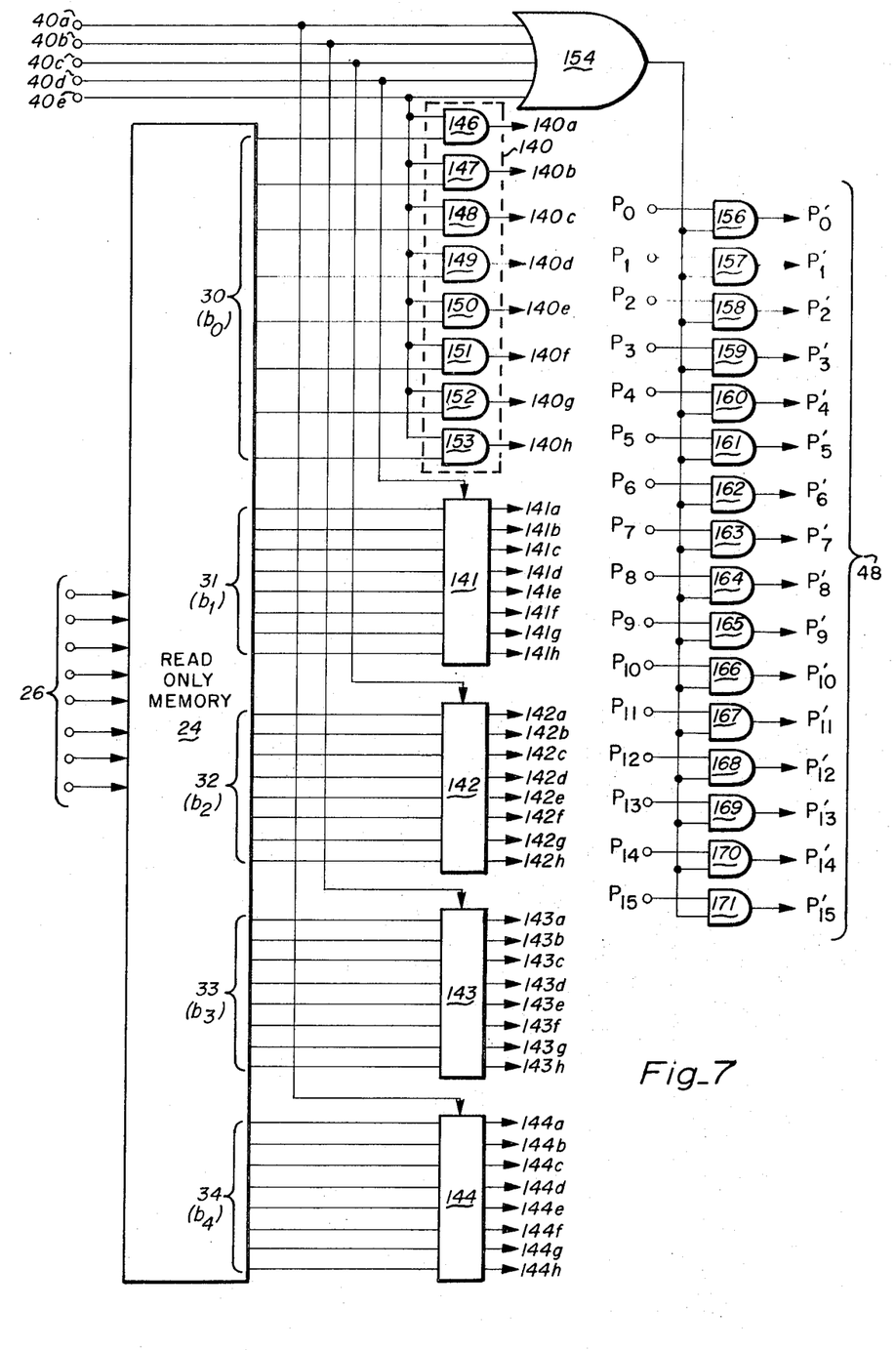
FIG. 7 is a logic block diagram of the read-only memory and a first portion of the gating network.

Referring now to FIG. 7, a part of gating network 28 is illustrated in greater detail with connections to read-only memory 24. Lines 26 are connected to the address input of memory 24. A single-forty digit binary number is provided at the output of the memory upon the application of an address input thereto. This binary number constitutes the five parameters $b_0$ through $b_4$ which are stored within memory 24. Gating circuits 140 through 144 decode the forty-digit binary number into the five individual parameters, or eight binary digits per parameter, in response to the five consecutive timing pulses provided on lines 40a through 40e, respectively. The timing signals on lines 40a through 40e are represented in waveforms 108 through 113, respectively, as shown in FIG. 5. It is again noted that the number of binary digits per parameter may be disparate in number. For example, parameter $b_0$ may comprise ten digits, $b_1$ nine digits, $b_2$ eight digits, and so forth, in order that memory storage requirements be reduced. However, for the description of a preferred embodiment herein, each parameter was selected as having eight binary digits.

The internal structure of a typical gating circuit is illustrated within circuit 140. One of two inputs of each of the AND gates 146 through 153 is connected to lines 30. The second input of each of these AND gates is connected to line 40e. Therefore, when a coincidence exists of a timing pulse on line 40e and a binary number at the output of the memory, the value for parameter $b_0$ is supplied on lines 140a through 140h. In a similar manner, parameter $b_1$ is provided on lines 141a through 141h when a coincidence of a timing signal on line 40d exists with a binary number at the output of the memory. Circuits 142, 143, and 144 are constructed and operate in the same fashion in response to timing pulses on lines 40c, 40b, and 40a, respectively.

Lines 40a through 40e are also connected to the input of OR gate 154. The output of OR gate 154 is connected to a first input of AND gates 156 through 171. Lines 46 from the output of product generator 42 (designated herein $P_0$ through $P_{15}$) are connected individually to the second input of individual AND gates 156 through 171, respectively. The output of AND gates 156 through 171 are connected to lines 48 (designated herein $P_0'$ through $P_{15}'$).

In operation, an address binary number is supplied to the memory by means of lines 26, and a single-forty digit binary number is provided on lines 30 through 34. Note from equation [3] hereinabove that parameter $b_4$ is decoded for the first cycle of operation. A timing pulse present on line 40a will effect the transfer of the parameter $b_4$ through circuit 144 to lines 144a through 144h. A short time thereafter a timing pulse is supplied on line 40b to effect the transfer of the parameter $b_3$ through circuit 143 to lines 143a through 143h. This operation continues through the application of parameter $b_0$ on lines 140a through 140h. The presence of a timing pulse on any of lines 40a through 40e will enable, by means of OR gate 154, AND gates 148 through 163 to effect the transfer of the product from product generator 42 on lines 46 ($P_0$ through $P_{15}$) to lines 48 ($P_0'$ through $P_{15}'$).

Figure 8:
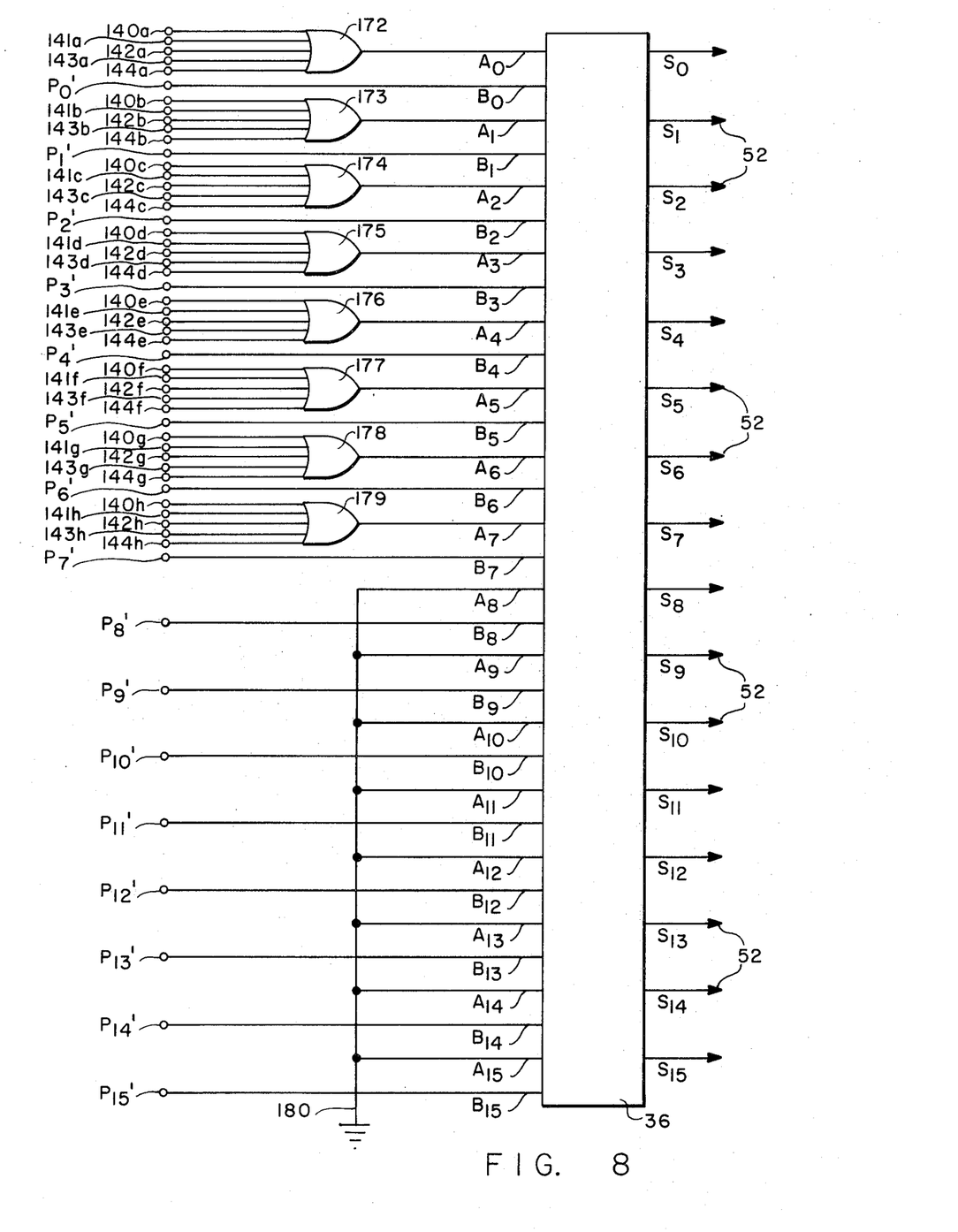
FIG. 8 is a logic diagram of a second portion of the gating network, and the adder.

Referring now to FIG. 8, a second portion of gating network 28 and adder 36 are illustrated in greater detail. Lines 140a, 141a, 142a, 143a, and 144a are connected to five inputs of an OR gate 172. Lines 140b through 144b are connected to five inputs of an OR gate 173. Lines 140c through 144c are connected to five inputs of an OR gate 174. Lines 140d through 144d are connected to five inputs of an OR gate 175. Lines 140e through 144e are connected to five inputs of an OR gate 176. Lines 140f through 144f are connected to five inputs of an OR gate 177. Lines 140g through 144g are connected to five inputs of an OR gate 178. Lines 140h through 144h are connected to five inputs of an OR gate 179. Adder 36 is a sixteen digit parallel adder having an A and a B input for each digit and sixteen sum outputs 52. The outputs of gates 172 through 179 are connected to the A inputs of the eight most significant digits of adder 36 with the output of gate 172 connected to the most significant input $A_0$ and the output of gate 179 connected to the input $A_7$. The remainder of the A inputs ($A_8$ through $A_{15}$) of adder 36 are connected together and to ground potential by a line 180. Adder 36 may be constructed in any manner well-known in the art of binary adder circuits. Provision is made within adder 36 for effecting a carry from one digit position to the next, which is also well-known in the art.

The output lines $P_0'$ through $P_{15}'$ from the product generator, via gating network 28, are applied to the B inputs $B_1$ through $B_{15}$ of adder 36. The line $P_0'$ is connected to the most significant digit position of adder 36, and $P_{15}'$ is applied to the B input of the least significant digit of adder 36. The remaining product inputs are connected respectively to the corresponding B inputs, $B_1$ through $B_{14}$ of adder 36. The sum output from adder 36 appears on lines 52 and are labeled $S_0$ for the most significant sum digit and $S_{15}$ for the least significant sum digit.

In operation, the product binary number provided on lines $P_0'$ through $P_{15}'$ is applied to the B inputs of adder 36. The portion of the binary number from memory 24, which is supplied on lines 144a through 144h (parameter $b_4$), is transferred from OR gates 172 through 179 to the A input of one half of adder 36. A zero is supplied to the A input of the second half of adder 36 as a result of the connection to ground potential by means of line 180. The sum of the binary numbers provided at the input of adder 36 is supplied on lines 52. In a similar manner, parameter $b_3$ is supplied to the A input of adder 36 by means of 143a through 143h and OR gates 172 through 179, respectively.

If a larger number of binary digits are employed for increasing the accuracy of the result of the system of the present invention, additional full-adder circuits may be added, and they would be connected in the manner as shown in FIG. 8.

Figure 9:
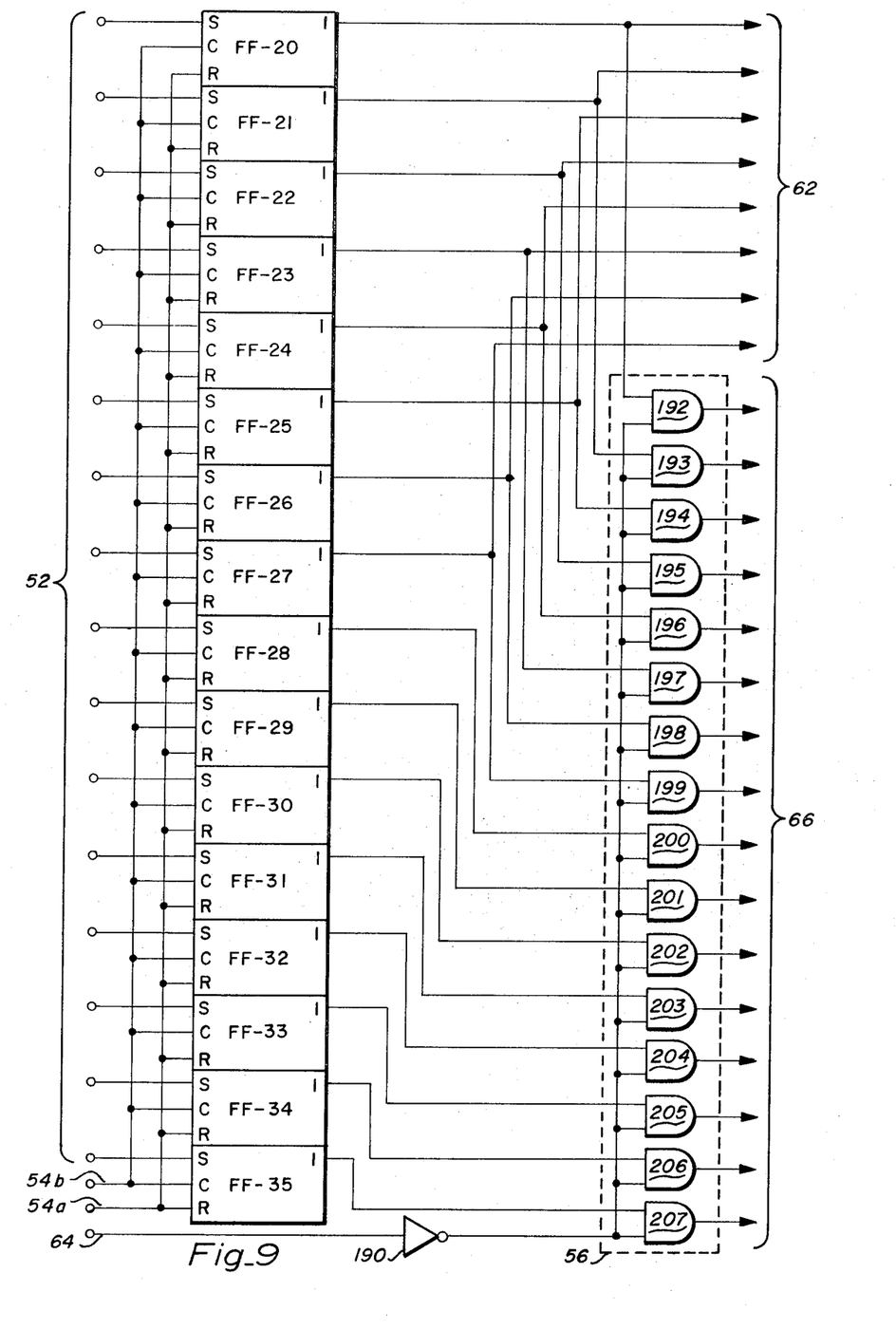
FIG. 9 is a logic diagram of the adder output register and the output buffer.

Referring now to FIG. 9, register 50 and output buffer 56 are shown in greater detail. The sum provided by adder 36 and supplied on lines 52 is applied to the SET inputs of flip-flops FF–20 through FF–35, which comprise register 50. Line 54b, originating in control unit 20, is connected to each of the CLOCK inputs of flip-flops FF–20 through FF–35. Line 54a, also originating in control unit 20, is connected to each of the RESET inputs of flip-flops FF–20 through FF–35. It is a characteristic of the flip-flops employed within register 50 that the particular binary number applied to the SET inputs is entered therein upon the application of a clock signal thereto. The state of the individual flip-flop outputs will remain the same until a RESET input is supplied thereto. Flip-flops FF–20 through FF–35 may be, for example, model number MC1015, manufactured by Motorola Semiconductor Products, Inc. of Phoenix, Arizona.

Line 64 is connected to the input of inverter 190, and the output thereof is connected to one of two inputs of each of AND gates 192 through 207. The ONE outputs of flip-flops FF–20 through FF–35 are connected to the second input of AND gates 192 through 207, respectively. The ONE output of flip-flops FF–20 through FF–27 are also connected to lines 62. It should be noted that lines 62 comprise the eight most significant digits of the binary number provided at the output of register 50, which is supplied as the mulitplicand input to product generator 42 by means of gating circuit 60. It is the purpose of register 50 to retain the value of the sum from adder 36 during an individual subcycle of operation. AND gates 192 through 207 comprise output buffer 56, and thereby provide means for supplying the final output from the system of the present invention. The outputs of AND gates 192 through 207 are connected to the output lines 66.

In operation, the binary number, comprising the sum output of adder 36, is supplied to the SET inputs of flip-flops FF–20 through FF–35. Upon the application of a clock signal (waveform 107) to the CLOCK input of register 50 the sum of adder 36 is entered into the register. Subsequently thereafter, this sum is provided at the output of register 50. The eight most significant digits of this binary number are provided on lines 62 and are applied at the input of gating circuit 60. Upon the completion of the fifth subcycle of operation, a low-level signal is supplied on line 64 which enables AND gates 192 through 207 to transfer therethrough the contents of register 50 to lines 66. It should be noted that the low-level signal referred to herein on line 64 consists of portion 114a of waveform 114 as shown in FIG. 5 above.

If it is desired that a larger number of binary digits are to be employed in the system contemplated by the present invention, then additional flip-flops and AND gates may be added and connected in a manner similar to that shown in FIG. 9.

While a specific embodiment of the present invention has been disclosed hereinabove, it is meant to be exemplary only. Those having skill in the related art of the present invention may modify and depart from the spirit of the disclosed embodiment, and it is therefore intended that an exclusive property right be granted within the breadth and scope as defined by the claims appended hereinbelow.

What I claim is:

1. A system for computing dependent variable values of mathematical functions in response to an independent variable differential and a reference break point value, said system comprising:
   a. a memory wherein predetermined parameters of a mathematical series expansion of said function are stored, said memory being addressable by said reference break point value;
   b. a product generator having multiplier and multiplicand inputs and a product output and means for applying said independent variable differential to said multiplier input;
   c. an adder having at least first and second inputs and a sum output, means for applying to said first input the product output from said product generator and means for applying to the second input the parameters recovered from memory in response to a referenced break point value;
   d. gating means connected between the sum output of said adder and the multiplicand input to said product generator to apply the sum output of the adder to said multiplicand input during a first time interval; and
   e. output means connected to said sum output of said adder for supplying the sum generated by said adder to the output of the system during a second time interval, the sum generated by said adder during the second time interval comprising the computed dependent variable.

2. The system as defined in claim 1 wherein said break-points comprise a series of values which are spaced uniformly with respect to said independent variable values, said reference break point being equal to the difference between an independent variable at which a dependent variable is to be computed and said independent variable differential.

3. The system defined in claim 1 further including a control circuit for generating a plurality of subcycle signals representative of individual iterations of a single computation, first means connected to said control circuit for applying said subcycle signals to the output of said memory, said control circuit also generating a cycle signal having a first state representative of said first time interval and a second state representative of said second time interval, and second means connected to said control circuit for applying said cycle signal to said gating means and said output means.

4. The system as defined in claim 3, wherein said gating means comprises:
   a. a register having an input connected to the output of said adder; and
   b. a logic-AND gating circuit having an input connected to the output of said register, and having an output connected to the multiplicand input of said multiplier, said logic-AND gating circuit being operative in response to said first state of said cycle signal.

5. The system as defined in claim 4, wherein said output means comprises a plurality of logic-AND circuits operative in response to said second state of said cycle signal.

6. A system for computing dependent variable values of mathematical functions in response to an independent variable differential and a reference break point value, said system comprising:
   a. a memory wherein predetermined parameters of a Taylor Series Expansion of said function are stored, said memory being addressable by said reference break point value;
   b. a binary asynchronous product generator having multiplier and multiplicand inputs thereto, and a product output therefrom, said multiplier input being said independent variable differential;
   c. a control circuit for generating subcycle signals and also a cycle signal having a first state which occurs during said subcycle signals and a second state which occurs exclusive of said subcycle signals;
   d. a gating network having an input connected to the output of said memory and operative in response to said subcycle signals;
   e. an adder having two inputs for values to be added and a sum output therefrom, a first of said adder inputs connected to the output of said gating network, and a second of said adder inputs connected to the product output of said product generator, whereby said parameters recovered from said memory are supplied to the input of said adder in response to said subcycle signals;
   f. a register having an input connected to the output of said adder;
   g. a logic-AND gating circuit having an input connected to the output of said register, and an output connected to the multiplicand input of said multiplier, said logic-AND gating circuit being operative in response to said first state of said cycle signal; and
   h. an output gating circuit having an input connected to the output of said register and an output connected to the output of said system, said output gating circuit being operative in response to said second state of said cycle signal.

* * * * *

UNITED STATES PATENT OFFICE
CERTIFICATE OF CORRECTION

Patent No. 3,813,529　　　　　　　　Dated May 28, 1974

Inventor(s) Kenneth G. Bartlett

It is certified that error appears in the above-identified patent and that said Letters Patent are hereby corrected as shown below:

Column 1, line 41, "are" should be --and--.

Column 2, line 22, after "which" insert --system--.

Column 4, line 17, "9" should be --/--.

Column 4, line 51, "maybe" should be --may be--.

Signed and sealed this 21st day of January 1975.

(SEAL)
Attest:

McCOY M. GIBSON JR.　　　　　　　　C. MARSHALL DANN
Attesting Officer　　　　　　　　　Commissioner of Patents